US012626608B2

(12) United States Patent
Baker et al.

(10) Patent No.: US 12,626,608 B2
(45) Date of Patent: May 12, 2026

(54) SYSTEM TO DETERMINE A PERSONALIZED LEARNING PATHWAY

(71) Applicants: John Baker, Kitchener (CA); Brian Cepuran, Kitchener (CA); Jeremy Auger, Kitchener (CA)

(72) Inventors: John Baker, Kitchener (CA); Brian Cepuran, Kitchener (CA); Jeremy Auger, Kitchener (CA)

(73) Assignee: SkillsWave Corporation

( * ) Notice: Subject to any disclaimer, the term of this patent is extended or adjusted under 35 U.S.C. 154(b) by 91 days.

(21) Appl. No.: 18/103,989

(22) Filed: Jan. 31, 2023

(65) Prior Publication Data

US 2023/0245579 A1      Aug. 3, 2023

Related U.S. Application Data

(60) Provisional application No. 63/304,902, filed on Jan. 31, 2022.

(51) Int. Cl.
*G09B 5/02*          (2006.01)
(52) U.S. Cl.
CPC ..................................... *G09B 5/02* (2013.01)

(58) Field of Classification Search
CPC ...................................................... G09B 5/02
See application file for complete search history.

(56) References Cited

U.S. PATENT DOCUMENTS

2014/0099626 A1*    4/2014  Kelly ....................... G09B 5/02
                                                                434/362

* cited by examiner

*Primary Examiner* — Kesha Frisby

(57) ABSTRACT

An electronic learning system and method for providing at least one recommended personalized learning pathway to a user. The system may include one or more computing devices that communicate input data, and receive output data, over a network with a learning management system. A server may be configured to: provide the learning management system over the network; store data, including user data, education provider data, and/or industry data, on at least one storage device; and implement at least one analytics engine. The analytics engine may be configurable to: analyze the data associated with the learning management system; generate personalized data indicative of a personalized learning pathway that enables a user to build the competencies for a desired career and/or grow an individual's career, the personalized data based at least in part on the analyzed data; and generate at least one recommendation for the user based on the personalized data.

16 Claims, 2 Drawing Sheets

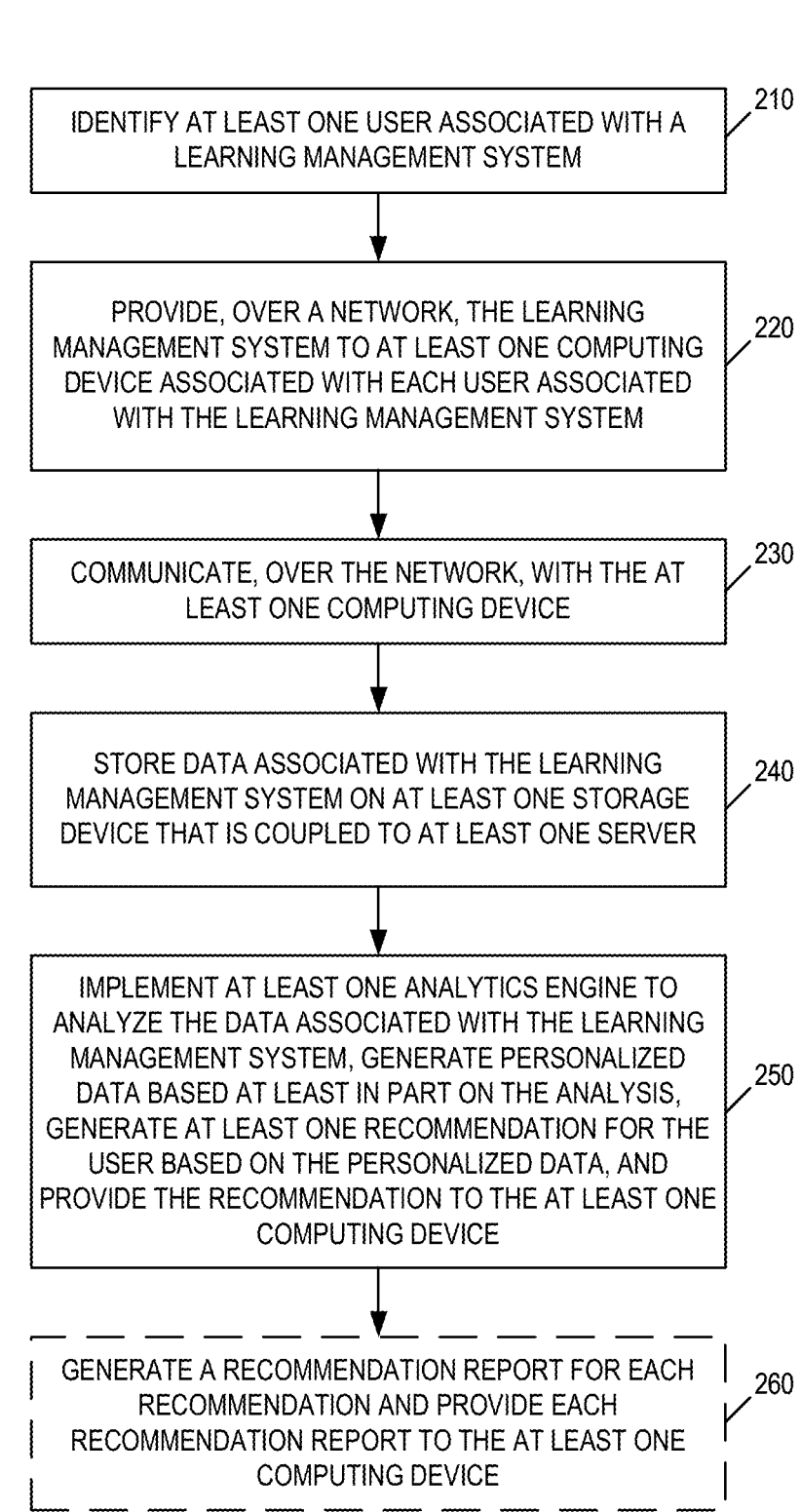

200

IDENTIFY AT LEAST ONE USER ASSOCIATED WITH A LEARNING MANAGEMENT SYSTEM — 210

PROVIDE, OVER A NETWORK, THE LEARNING MANAGEMENT SYSTEM TO AT LEAST ONE COMPUTING DEVICE ASSOCIATED WITH EACH USER ASSOCIATED WITH THE LEARNING MANAGEMENT SYSTEM — 220

COMMUNICATE, OVER THE NETWORK, WITH THE AT LEAST ONE COMPUTING DEVICE — 230

STORE DATA ASSOCIATED WITH THE LEARNING MANAGEMENT SYSTEM ON AT LEAST ONE STORAGE DEVICE THAT IS COUPLED TO AT LEAST ONE SERVER — 240

IMPLEMENT AT LEAST ONE ANALYTICS ENGINE TO ANALYZE THE DATA ASSOCIATED WITH THE LEARNING MANAGEMENT SYSTEM, GENERATE PERSONALIZED DATA BASED AT LEAST IN PART ON THE ANALYSIS, GENERATE AT LEAST ONE RECOMMENDATION FOR THE USER BASED ON THE PERSONALIZED DATA, AND PROVIDE THE RECOMMENDATION TO THE AT LEAST ONE COMPUTING DEVICE — 250

GENERATE A RECOMMENDATION REPORT FOR EACH RECOMMENDATION AND PROVIDE EACH RECOMMENDATION REPORT TO THE AT LEAST ONE COMPUTING DEVICE — 260

FIG. 2

SYSTEM TO DETERMINE A PERSONALIZED LEARNING PATHWAY

CROSS-REFERENCE TO RELATED APPLICATIONS

This application claims the benefit of U.S. Provisional Patent Application No. 63/304,902 filed on Jan. 31, 2022. The entire contents of U.S. Provisional Patent Application No. 63/304,902 is hereby incorporated herein by reference for all purposes.

TECHNICAL FIELD

The embodiments herein relate to the field of electronic learning and, in particular, to systems and methods for determining a personalized learning pathway.

BACKGROUND

Electronic learning (also called e-Learning or eLearning) generally refers to education or learning where users engage in education related activities using computers and other computer devices. For example, users may enroll or participate in a course or program of study offered by an educational institution (e.g., a college, university, or grade school) through a web interface that is accessible over the Internet. Similarly, users may receive assignments electronically, participate in group work and projects by collaborating online, and be graded based on assignments and examinations that are submitted using an electronic dropbox.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g., studying an electronic textbook or watching a recorded or live webcast of a lecture) that is not associated with a particular institution or organization.

Electronic learning often occurs without any face-to-face interaction between the users in the educational community. Accordingly, electronic learning overcomes some of the geographic limitations associated with more traditional learning methods, and may eliminate or greatly reduce travel and relocation requirements imposed on users of educational services.

Furthermore, because course materials can be offered and consumed electronically, there are fewer physical restrictions on learning. For example, the number of students that can be enrolled in a particular course may be practically limitless, as there may be no requirement for physical facilities to house the students during lectures. Furthermore, learning materials (e.g., handouts, textbooks, etc.) may be provided in electronic formats so that they can be reproduced for a virtually unlimited number of students. Finally, lectures may be recorded and accessed at varying times (e.g., at different times that are convenient for different users), thus accommodating users with varying schedules, and allowing users to be enrolled in multiple courses that might have a scheduling conflict when offered using traditional techniques.

At many stages throughout a user's educational and professional development, decisions may be made pertaining to where to go next and how to get there. For example, toward the end of a standard educational degree, such as high school, undergraduate at a college or university, and the like, students often attempt to identify a career to pursue and/or the competencies required to qualify for such a career. However, it is often the case that students do not know their educational and professional options based on their currently held competencies, nor do they know what competencies are required for a particular career. Similarly, professional users may wish to grow within their current career or investigate other careers that their currently held competencies may qualify them for. However, such users may not know which direction to go, which competencies to build on, and/or which additional competencies are required.

These decisions may be substantial and should be made accordingly. They can have significant financial and temporal implications, as well as impact the user's professional options. If chosen incorrectly, these decisions can further lead to low educational and/or professional satisfaction and, in turn, negatively impact one's life satisfaction and mental health. Further, the sunk cost fallacy may tend to keep individuals in an unsatisfactory position due to the resources invested, exacerbating the negative impacts misguided, misinformed, or uninformed educational and professional decisions.

Accordingly, the inventors have identified a need for systems, methods, and apparatuses that attempt to address at least some of the above-identified challenges.

SUMMARY

According to one broad aspect, there is provided an electronic learning system. The electronic learning system may include one or more computing devices that communicate over a network with a learning management system, at least one computing device having a graphical user interface for providing data to the learning management system and outputting data to a user. The electronic learning system may further include at least one server configured to: provide the learning management system over the network; communicate with the one or more computing devices; store data associated with the learning management system on at least one storage device that is coupled to the at least one server, the data comprising user data, education provider data, and/or industry data; and implement at least one analytics engine.

In some embodiments, the at least one analytics engine may be configurable to: analyze the data associated with the learning management system; generate personalized data based at least in part on the analyzed data associated with the learning management system, the personalized data being indicative of a personalized learning pathway that enables a user to build the competencies for a desired career and/or grow an individual's career; and generate at least one recommendation for the user based on the personalized data, wherein each recommendation is provided on the at least one computing device.

In some embodiments, the at least one analytics engine may include a probabilistic model for recommending learning pathways based on characteristics pertaining to the individual and historical information pertaining to others that followed similar paths or developed similar competencies.

In some embodiments, the data associated with the learning management system may further include at least one of:

(i) user personal profile data; (ii) education provider data; (iii) crowd sourcing tagging of skills and/or competencies; (iv) internet sources using semantic analysis; (v) information pertaining to skill gaps at industry level; and (vi) historical data pertaining to other users that followed similar paths or developed similar competencies.

In some embodiments, the user personal profile data may include role, interests, background education, competencies, and competency gaps of the user.

In some embodiments, the education provider data may include information from education providers including colleges and universities, the information indicating what programs lead into certain skills.

In some embodiments, the education provider data may include information from private education providers including training and certification providers, the information indicating what programs lead into certain skills.

In some embodiments, the recommendation includes at least one of: (i) data indicative of one or more courses or development pathways including certificates and degrees; (ii) recommendations for careers; and/or (iii) data indicative of a competency gap between a desired outcome and individual's current competency, and programs or pathways that best overlay the gap.

In some embodiments, the server is further configured to generate a recommendation report for each recommendation and provide the recommendation report on the at least one computing device.

According to another broad aspect, there is provided method for analyzing information captured in an electronic learning system. The method may include: identifying at least one user associated with a learning management system; providing, over a network, the learning management system to at least one computing device associated with each user associated with the learning management system; communicating, over the network, with the at least one computing device, the at least one computing device comprising a graphical user interface for providing data to the learning management system and outputting data to a user; storing data associated with the learning management system on at least one storage device that is coupled to at least one server, the data comprising user data, education provider data, and/or industry data; and implementing at least one analytics engine.

In some embodiments, the at least one analytics engine may be configurable to: analyze the data associated with the learning management system; generate personalized data based at least in part on the analyzed data associated with the learning management system, the personalized data being indicative of a personalized learning pathway that enables a user to build the competencies for a desired career and/or grow an individual's career; and generate at least one recommendation for the user based on the personalized data, wherein the recommendation is provided on the at least one computing device.

In some embodiments, the at least one analytics engine may include a probabilistic model for recommending learning pathways based on characteristics pertaining to the individual and historical information pertaining to others that followed similar paths or developed similar competencies.

In some embodiments, the data associated with the learning management system may further include at least one of: (i) user personal profile data; (ii) education provider data; (iii) crowd sourcing tagging of skills and/or competencies; (iv) internet sources using semantic analysis; (v) information pertaining to skill gaps at industry level; and (vi) historical data pertaining to other users that followed similar paths or developed similar competencies.

In some embodiments, the user personal profile data may include role, interests, background education, competencies, and competency gaps of the user.

In some embodiments, the education provider data may include information from education providers including colleges and universities, the information indicating what programs lead into certain skills.

In some embodiments, the education provider data may include information from private education providers including training and certification providers, the information indicating what programs lead into certain skills.

In some embodiments, the recommendation includes at least one of: (i) data indicative of one or more courses or development pathways including certificates and degrees; (ii) recommendations for careers; and/or (iii) data indicative of a competency gap between desired outcome and individual's current competency, and programs or pathways that best overlay the gap.

In some embodiments, the method may further includes generating a recommendation report for each recommendation; and providing, over the network, each recommendation report to the at least one computing device of the user.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 2 shows a flowchart diagram of a method for analyzing information captured in an electronic learning system.

DETAILED DESCRIPTION

Figure 1:
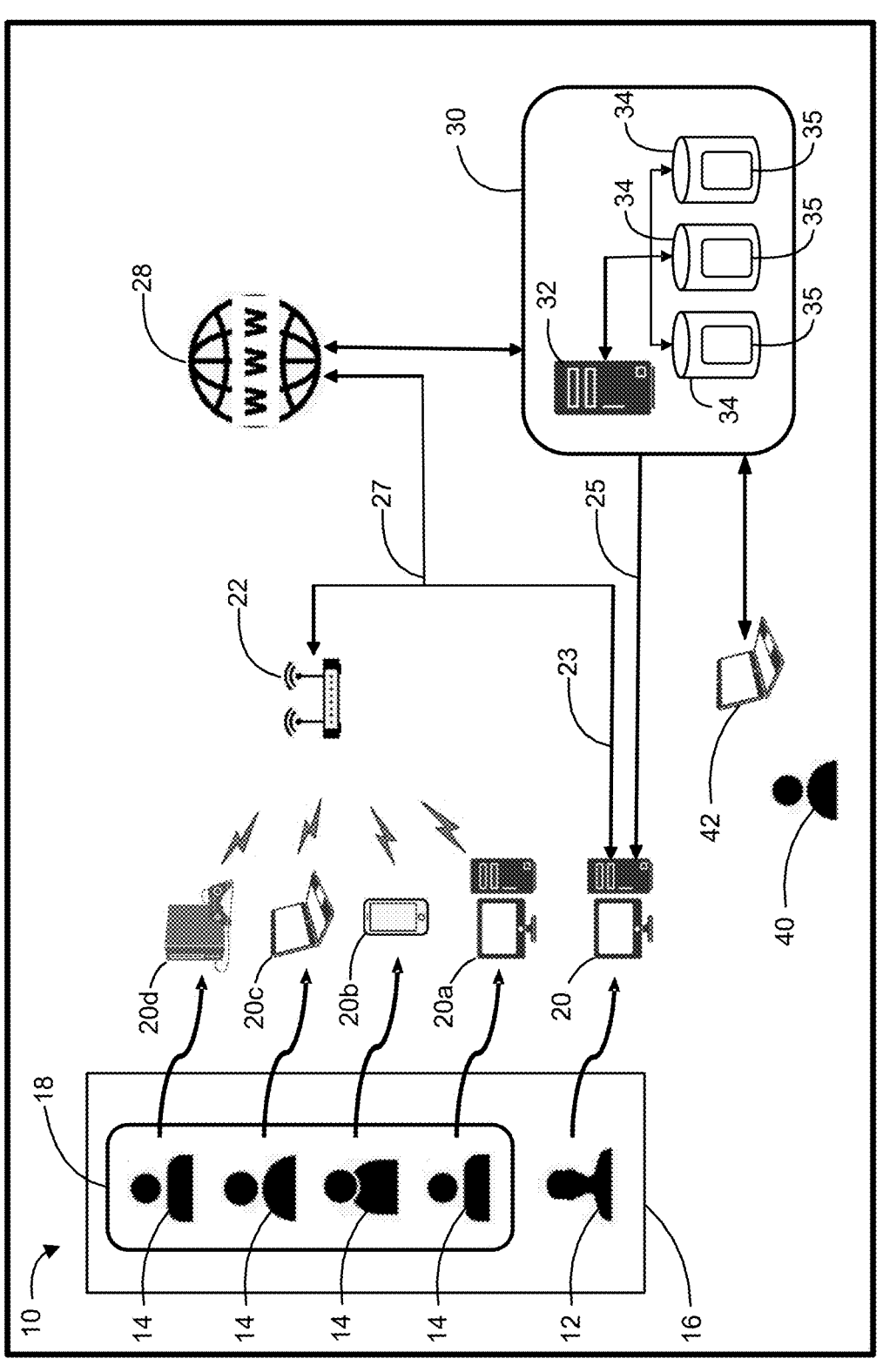
FIG. 1 shows a schematic diagram of components interacting within an electronic learning system in accordance with some embodiments.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present subject matter.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Referring now to FIG. 1, shown therein is a schematic diagram of components interacting within an electronic learning system 10 in accordance with some embodiments. The electronic learning system 10 may be particularly configured for recommending at least one personalized learning pathway to a user that would enable the user to build the competencies for a desired career and/or grow an individual's career. Although shown as an electronic learning system 10, in other instances the system 10 may not be limited to electronic learning systems and it may be other types of systems.

Using the system 10, one or more users 12, 14 may communicate with a learning management system 30 to generate personalized learning pathways. The users 12, 14 may not be recommended like personalized learning pathways. For example, each learning pathway may be personalized to a particular user 12, 14 based on data provided by that user 12, 14. In this sense, "personalized" may be understood to be a pathway designed to meet a user's individual requirements including, but not limited to, the user's desired outcome and personal characteristics. This does not preclude the same personalized learning pathway from being recommended to more than one user 12, 14.

A personalized learning pathway can be an electronic object that is presented to the user 12, 14 in a graphical user interface of a computing device 20, allowing the user to follow a specified electronic (or virtual) path through the information space. For example, the personalized learning pathway may take into account the user's 12, 14 profile into the N dimensional total information space. For example, the personalized learning pathway can be directional, meaning that the user may follow the sequence of the electronic paths (including electronic courses and evaluations). For example, the personalized learning pathway can provide a completion estimate of a particular value in the context of changing career requirements or learning requirements. Different users may have different learning pathways associated with the same dataset, even while engaging in the same career path. For instance, an individual majoring in biology sciences can be presented with a very different personalized learning pathway than another individual majoring in biomedical sciences, while both individuals attempt to build competencies for a desired career in chemical engineering, and/or grow their career as chemical engineers.

It should be understood that a personalized learning pathway in not limited to a course or collection of courses offered by a formal educational institution, such as a traditional "bricks and mortar" educational institution (e.g., a grade school, university, or college). The personalized learning pathway may also include courses, seminars, training, and the like, offered by any other educational service provider (e.g., an online university, a company that specializes in offering training courses, an organization with an internal and/or external training department, a professional certification program, and the like). A personalized learning pathway may include any form of learning instruction offered by an entity of any type, and any combination thereof.

In some embodiments, a single user 12, 14 may communicate with the learning management system 30 to generate a personalized learning pathway. For example, the user 12, 14 may be an individual seeking to identify educational and/or professional options to pursue, so as to further their educational and/or professional development in a particular direction or in a direction recommended by the electronic learning system 10.

In some embodiments, one or more groups can be defined that include one or more of the users 12, 14. For example, as shown in FIG. 1, the users 12, 14 may be grouped together in a development group 16, with a first user 12 or "coordinator" being responsible for organizing the development group 16 and directing the other users 14 or "learners," or facilitating the learners' 14 access, to the appropriate resources based on their recommended personalized learning pathways. In some examples, the coordinator 12 may be a high school guidance counsellor or an organization's professional development representative for the development group 16, which may be a graduating class or group of employees, respectively. In such examples, the coordinator 12 may be assisting the learners 14 in identifying and planning their post-secondary aspirations, or furthering employee development within the organization, respectively.

In some cases, development sub-groups 18 may also be formed. For example, the users 14 are shown to be a part of educational sub-group 18 in FIG. 1. The group may be formed in relation to a personal development pathway common to each user 14. For example, the development sub-group 18 may include users 14 embarking on a like personal learning pathway.

The communication between the users 12, 14 and the learning management system 30 can occur either directly or indirectly using any suitable computing device having a graphical user interface for providing data to the learning management system 30 and outputting data to a user 12, 14. For example, the user 12 may use a computing device 20 such as a desktop computer 20 that has at least one input device (e.g., a keyboard, a mouse, a touch screen, and the like) and at least one output device (e.g., a display screen, speakers, and the like) operating over a wired connection 23. The computing device 20 can generally be any other suitable device for facilitating communication between the user 12, 14 and the learning management system 30. For example, the computing device 20 could be a terminal 20a, a wirelessly enabled personal data smart phone 20b or tablet, a laptop 20c wirelessly coupled to an access point 22 (e.g., a wireless router, a cellular communications tower, etc.), or a gaming console 20d operating over a wired or wireless connection.

The computing devices 20 may be connected to the learning management system 30 via any suitable communications channel. For example, the computing devices 20 may communicate to the learning management system 30 over a Local Area Network (LAN) or intranet, or using an external network (e.g., by using a browser on the computing device 20 to browse to one or more web pages or other electronic files presented over the Internet 28 over a data connection 27).

In some examples, one or more of the users 12, 14 may be required to authenticate their identities in order to communicate with the learning management system 30. For example, each of the users 12, 14 may be required to input a user identifier such as a login name, and/or a password associated with that user or otherwise identify themselves to gain access to the system 10.

In some examples, one or more users (e.g., "guest" users) may be able to access the system 10 without authentication. Such guest users may be provided with limited access, such as the ability to review one or more components of the learning management system 30 to decide whether they would like to generate personalized learning pathways.

In some embodiments, the wireless access points 22 may connect to the learning management system 30 through a data connection 25 established over the LAN or intranet. Alternatively, the wireless access points 22 may be in communication with the learning management system 30 via the Internet 28 or another external data communications network. For example, one user 14 may use a laptop 20c to browse to a webpage that displays elements of a learning management system (e.g., a personal profile page).

The electronic learning system 10 generally includes a number of functional components for facilitating the provision of a personalized learning pathway. For example, the learning management system 30 generally includes one or more processing devices such as servers 32, each having one or more processors. The servers 32 may be configured to provide the learning management system 30 over the network and communicate with the one or more computing devices 20 (e.g., send information, such as electronic files or webpages, to be displayed on the one or more computing devices 20).

The learning management system 30 also generally includes one or more data storage devices 34 (e.g., memory, and the like) that are in communication with the servers 32, and could include a relational database (such as a SQL database), or other suitable data storage devices. The data storage devices 34 may be configured to host data 35 associated with the learning management system 30, such as user data, education provider data, and/or industry data, for example. The servers 32 may be configured to manage the collection, storage, use, updating, and the like, of the data 35 associated with the learning management system 30, such as the types of data 35 described herein.

In some embodiments, the data 35 associated with the learning management system 30 stored in the data storage devices 34 may include at least one of: (i) user personal profile data; (ii) education provider data; (iii) crowd sourcing tagging of skills and/or competencies; (iv) internet sources using semantic analysis; (v) information pertaining to skill gaps at industry level; and (vi) historical data pertaining to other users that followed similar paths or developed similar competencies.

User personal profile data may include personal information input by the user 12, 14 communicated to the learning management system 30 via a computing device 20. For example, user personal profile data may include a currently held role, interests, background education, competencies and competency gaps, and other characteristics of the user 12, 14. Personal profile data may also include personal qualifications (e.g., soft skills such as leadership, presenting, and the like), educational qualifications (e.g., certifications, degrees, and the like), and/or professional qualifications (e.g., past positions held, industry-specific training, and the like), for example. It may also include one or more desired outcomes of a personalized learning pathway, such as the development of one or more target competencies and/or the development of one or more competencies required for a target career.

Education provider data may include information from education providers including colleges and universities, the information indicating what programs lead into certain skills. For example, the colleges and universities may provide data on which course or collection of courses (e.g., program or stream) leads to certain competencies and accreditations. They may also provide data on alumni who have completed the course or collection of courses, such as their characteristics, performance, and the career(s) that they entered following their completion. Education provider data may further include information from other education entities including those that offer training and certification programs, the information indicating what programs lead into certain skills. Similarly, such information may further include data on the career(s) and/or position(s) held by those who have completed the programs.

Crowd sourcing tagging of skills and/or competencies may be sourced, for example, from professional profiles of individuals and/or direct surveying of professionals to identify which skills/competencies/qualifications (collectively referred to herein as competencies) are possessed by individuals in certain careers. Similarly, internet sources (e.g., professional profiles, job postings, and the like) may be parsed using semantic analysis to, for example, identify which competencies are desirable for, and/or commonly associated with, individuals in certain careers. Information pertaining to skill gaps at industry level may also be sourced to identify, for example, which competencies are desirable yet lacking amongst individuals within certain careers.

Historical data pertaining to other users that followed similar paths or developed similar competencies may also be stored, updated, and used to predict future outcomes based on past occurrences. For example, such historical data may reveal that users 12, 14 with a particular combination of personal profile data have an aptitude for one or more specific personal learning pathways and/or a predisposition toward one or more specific careers. Historical data may further include a collection of the other types of data 35 associated with the learning management system 30 that has been collected in the past, including the analysis thereof, which may include the particular correlations identified and recommendations made, for example. This may enable the learning management system 30 to provide personalized learning pathway and/or career recommendations within which the user 12, 14 may experience a higher degree of success and/or satisfaction.

The data storage devices 34 may also store authorization criteria that define what actions may be taken by the users 12, 14. In some embodiments, the authorization criteria may include at least one security profile associated with at least one role. For example, one role could be defined for the first user 12 who is primarily responsible for coordinating the group of second users 14 and overseeing their engagement with the system 10. Users with such a role may have a security profile that allows them to configure various components such as the type of allowable user inputs (e.g., competency-based desired outcome, career-based desired outcome, etc.), the types of output recommendation(s) (e.g., learning pathways for specified competencies and/or careers, learning pathways for competencies and/or careers identified as potentially suitable for the user, etc.), the number of each type of recommendation, and so on. For example, a professional development coordinator for a particular organization may wish to restrict inputs and outputs to develop personalized learning pathways specific to facilitating the growth of employees within that particular organization.

In some embodiments, some of the authorization criteria may be defined by specific users 40 who may or may not be part of the development group 16. For example, administrator users 40 may be permitted to administer and/or define global configuration profiles for the system 10, define roles within the system 10, set security profiles associated with the roles, and assign the roles to particular users 12, 14 in the system 10. In some cases, the users 40 may use another computing device (e.g., a desktop computer 42) to accomplish these tasks.

The learning management system 30 may implement at least one analytics engine to process the user personal profile data input by the user 12, 14, and at least one of the data 35 associated with the learning management system 30 as discussed herein. In some embodiments, the at least one analytics engine may be configurable to: analyze the data 35 associated with the learning management system 30; generate personalized data based at least in part on the analyzed data associated with the learning management system 30, the personalized data being indicative of a personalized learning pathway that enables a user to build the competencies for a desired career and/or grow an individual's career; and generate at least one recommendation for the user 12, 14 based on the personalized data.

The at least one analytics engine may include, for example, a probabilistic model for recommending learning pathways based on characteristics pertaining to the individual and historical information pertaining to others that followed similar paths or developed similar competencies. Other types of modelling suitable for modelling, identifying, and predicting relationships may also be used.

Probabilistic models are a form of statistical model, which uses probability distributions to model relationships while accounting for the inherent variability of actual data. The probabilistic model deployed may be part of an artificial intelligence trained model such that, overtime, the strength of positive correlations identified, based upon which recommendations may be made, may be improved and thereby the recommendations may become more suitable or appropriate for each user 12, 14. The artificial intelligence trained model may assign scores or weights to define its confidence, or the probability, that a particular identified correlation is true.

For example, a positive correlation may be identified between individuals in a certain career, and a particular competency commonly possessed, such as having completed a particular course or collection of courses. Further, each noted occurrence of such a relationship, or each successful completion of a recommended personalized learning pathway that culminated in reaching the same desired career, the artificial intelligence trained model may increase the confidence score assigned to that correlation in the probabilistic model. Such updated correlations may be stored as data 35 in the data storage devices 34 to further improve the confidence of future recommendations. The probabilistic model may factor in a number of variables, each with its own assigned positive correlation weighting, based upon which to make the recommendation(s).

As another example, based on the user's 12, 14 personal profile data, a probabilistic model may analyze individuals similar to the user 12, 14 who have followed certain learning pathways, and factor their performance and results from those learning pathways to predict the outcome should the user 12, 14 pursue the same path (e.g., a similar individual performed well in a given pathway and ended up with a career in a particular industry). Similarly, the analytics engine may evaluate an array of careers and the individuals in each respective career to identify the competencies that are required, commonly held, desired, and/or lacking (e.g., an industry gap) within those careers.

The analysis of this data, including the identified positive correlations and the strengths thereof, may form at least part of the personalized data generated by the analytics engine. In this way, the probabilistic model may make personalized learning pathway recommendations based on, for example, data about individuals in a desired career, individuals with the desired set of competencies, the performance of individuals similar to the user 12, 14 in obtaining the desired career and/or desired competencies, and the predisposition of individuals similar to the user 12, 14 to particular careers, among other factors, and a confidence score assigned and updated for each identified positive correlation therein.

The recommendation(s) may be provided to the user 12, 14 from the learning management system 30, over the network, to the graphical user interface of the at least one computing device 20. The learning management system 30 may generate one or more recommendation reports, such as depending on the scope of the user's 12, 14 subscription or authorizations to the electronic learning system 10. The recommendation may include at least one of: (i) data indicative of one or more courses or development pathways including certificates and degrees; (ii) recommendations for careers; and/or (iii) data indicative of a competency gap between a desired outcome and individual's current competency, and programs or pathways that best overlay the gap.

In some embodiments, the server may be further configured to generate a recommendation report for each recommendation and provide the recommendation report on the at least one computing device. The recommendation reports may, for example, break down each recommended personalized learning pathway and/or career. Such a report may detail, for example, the positive correlations identified by the analytics engine, the weightings or scores assigned to each, as well as the ultimate scores assigned to each recommendation, among other details. In some examples, the ultimate scores, which may be used to rank the recommendations, may be indicative of the likelihood of a particular personalized learning pathway leading to a desired outcome, such as the development of one or more desired competencies, or the development of one or more competencies required for a desired career. In the latter scenario, the report may further include the likelihood that the competencies identified close the competency gap between the user's current competencies and the competencies required for the desired career. There are, of course, a substantial number of ways in which the data may be usefully displayed in a recommendation report. The data of a recommendation report may be beneficial to the user to base their decision upon as to which recommendation to pursue.

|

The system 10 described herein provides a software-based tool to a user 12, 14 based on one or more positive correlations (using e.g., a probabilistic model) between the user's 12, 14 input personal profile data and the other data 35 associated with the learning management system 30 as described herein, including positive correlations between the user's 12, 14 input personal profile data and positive correlations within and between the other data 35 itself. The one or more positive correlations can be determined by the analytics engine, such as by a probabilistic model, for example.

Referring now to FIG. 2, shown therein is a method 200 for analyzing information captured in an electronic learning system.

At step 210 the method may include identifying at least one user associated with a learning management system. The user may be identified, for example, through authentication such as an input user identifier such as a login name, and/or a password associated with that user or other means of identifying themselves to gain access to the system.

At step 220 the method may include providing, over a network, the learning management system to at least one computing device associated with each user associated with the learning management system.

At step 230 the method may include communicating, over the network, with the at least one computing device. The learning management system may output data to the user, such as a webpage including a digital form with fillable fields, to be displayed on a graphical user interface of the at least one computing device and manipulated via said device. The user may provide personal data to the learning management system over the network via the at least one computing device.

At step 240 the method may include storing data associated with the learning management system on at least one storage device that is coupled to at least one server, the data comprising user data, education provider data, and/or industry data.

The data associated with the learning management system may further include at least one of: (i) user personal profile data; (ii) education provider data; (iii) crowd sourcing tagging of skills and/or competencies; (iv) internet sources using semantic analysis; (v) information pertaining to skill gaps at industry level; and (vi) historical data pertaining to other users that followed similar paths or developed similar competencies.

The particular types of data falling within each category may include, or be similar to, the exemplary types of data described herein. For example, the user personal profile data may include a current role, interests, background education, competencies, and competency gaps of the user. The education provider data may include information from education providers including colleges and universities, the information indicating what programs lead into certain skills. The education provider data may further include information from private education providers including training and certification providers, the information indicating what programs lead into certain skills.

At step 250 the method may include implementing at least one analytics engine. The at least one analytics engine may be configurable to: analyze the data associated with the learning management system; generate personalized data based at least in part on the analyzed data associated with the learning management system; and generate at least one recommendation for the user based on the personalized data. The at least one recommendation may then be provided on the at least one computing device. For example, the generated recommendation(s) may be provided to the computing device of the user, over the network, and displayed on the graphical user interface.

The analytics engine may identify personalized learning pathway(s) by analyzing the data associated with the learning management system and generating personalized data. The personalized data may be indicative of a personalized learning pathway that enables a user to build the competencies for a desired career and/or grow an individual's career. Such analysis may be performed, for example, using a probabilistic model as described herein for recommending learning pathways based on characteristics pertaining to the individual, historical information pertaining to others that followed similar paths or developed similar competencies, and other data associated with the learning management system as has been collected, stored, and updated as described herein.

The recommendation may include at least one of: (i) data indicative of one or more courses or development pathways including certificates and degrees; (ii) recommendations for careers; and/or (iii) data indicative of a competency gap between a desired outcome and the individual's current competency, and programs or pathways that best overlay the gap. At optional step 260 the method may include generating a recommendation report for each recommendation and providing each recommendation report to the at least one computing device of the user. The learning management system may communicate the at least one recommendation and/or the at least one recommendation report to the user, over the network, to the user computing device to be viewed the graphical user interface thereof.

In following the method as described herein, the learning management system may provide a user with, among other things, personalized learning pathways to develop desired competencies, personalized learning pathways to develop competencies required for a desired career, and recommended pathways and careers based on a probabilistic model for predicting careers and/or pathways to which a user may be well suited or predisposed. The electronic learning system may facilitate one's personal, educational, and/or professional development and may lead to a higher level of life satisfaction.

The invention claimed is:

1. An electronic learning system, comprising:

one or more computing devices that communicate over a network with a learning management system, at least one computing device comprising a graphical user interface for providing data to the learning management system and outputting data to at least one user of a plurality of users;

at least one server configured to:

provide the learning management system over the network;

communicate with the one or more computing devices;

store data associated with the learning management system on at least one storage device that is coupled to the at least one server, the data comprising user data, education provider data, and/or industry data;

implement at least one analytics engine, wherein the at least one analytics engine comprises a probabilistic model for recommending learning pathways, the probabilistic model being a trained statistical model configured to analyze and identify data correlations, wherein the at least one analytics engine is configurable to:

analyze the data associated with the learning management system;

generate personalized data based at least in part on the analyzed data associated with the learning management system, the personalized data being indicative of a personalized learning pathway that enables each user of a plurality of users to build the competencies for a desired career and/or grow an individual's career; and generate at least one recommendation for each user based on statistical analysis, by the probabilistic model, of the personalized data associated with the learning management system, wherein each recommendation is provided on the at least one computing device.

2. The system of claim 1, wherein the at least one analytics engine comprises a probabilistic model is configured to recommend the learning pathways based on characteristics pertaining to the individual and historical information pertaining to others that followed similar paths or developed similar competencies.

3. The system of claim 1, wherein the data associated with the learning management system further comprises at least one of: (i) user personal profile data; (ii) education provider data; (iii) crowd sourcing tagging of skills and/or competencies; (iv) internet sources using semantic analysis; (v) information pertaining to skill gaps at industry level; and (vi) historical data pertaining to other users that followed similar paths or developed similar competencies.

4. The system of claim 3, wherein each user personal profile data comprises role, interests, background education, competencies, and competency gaps of each user.

5. The system of claim 3, wherein the education provider data comprises information from education providers including colleges and universities, the information indicating what programs lead into certain skills.

6. The system of claim 3, wherein the education provider data comprises information from private education providers including training and certification providers, the information indicating what programs lead into certain skills.

7. The system of claim 1, wherein the at least one recommendation includes at least one of: (i) data indicative of one or more courses or development pathways including certificates and degrees; (ii) recommendations for careers; and/or (iii) data indicative of a competency gap between a desired outcome and individual's current competency, and programs or pathways that best overlay the gap.

8. The system of claim 7, wherein the server is further configured to generate a recommendation report for each recommendation and provide the recommendation report on the at least one computing device.

9. A method for analyzing information captured in an electronic learning system, the method comprising:

identifying at least one user of a plurality of users associated with a learning management system;

providing, over a network, the learning management system to at least one computing device associated with each user associated with the learning management system;

communicating, over the network, with the at least one computing device, the at least one computing device comprising a graphical user interface for providing data to the learning management system and outputting data to each user of a plurality of users;

storing data associated with the learning management system on at least one storage device that is coupled to at least one server, the data comprising user data, education provider data, and/or industry data;

implementing at least one analytics engine, wherein the at least one analytics engine comprises a probabilistic model for recommending learning pathways, the probabilistic model being a trained statistical model configured to analyze and identify data correlations, wherein the at least one analytics engine is configurable to:

analyze the data associated with the learning management system;

generate personalized data, by the probabilistic model, based at least in part on the analyzed data associated with the learning management system, the personalized data being indicative of a personalized learning pathway that enables each user of a plurality of users to build the competencies for a desired career and/or grow an individual's career; and generate at least one recommendation for each user based on statistical analysis, by the probabilistic model, of the personalized data associated with the learning management system, wherein each recommendation is provided on the at least one computing device.

10. The method of claim 9, wherein the at least one analytics engine comprises a probabilistic mode is configured to recommend the learning pathways based on characteristics pertaining to the individual and historical information pertaining to others that followed similar paths or developed similar competencies.

11. The method of claim 9, wherein the data associated with the learning management system further comprises at least one of: (i) user personal profile data; (ii) education provider data; (iii) crowd sourcing tagging of skills and/or competencies; (iv) internet sources using semantic analysis; (v) information pertaining to skill gaps at industry level; and (vi) historical data pertaining to other users that followed similar paths or developed similar competencies.

12. The method of claim 11, wherein each user personal profile data comprises role, interests, background education, competencies, and competency gaps of each user.

13. The method of claim 11, wherein the education provider data comprises information from education providers including colleges and universities, the information indicating what programs lead into certain skills.

14. The method of claim 11, wherein the education provider data comprises information from private education providers including training and certification providers, the information indicating what programs lead into certain skills.

15. The method of claim 9, wherein the recommendation includes at least one of: (i) data indicative of one or more courses or development pathways including certificates and degrees; (ii) recommendations for careers; and/or (iii) data indicative of a competency gap between desired outcome and individual's current competency, and programs or pathways that best overlay the gap.

16. The method of claim 15, further comprising:

generating a recommendation report for each recommendation; and providing, over the network, each recommendation report to the at least one computing device of each user.

* * * * *